United States Patent
Chon et al.

(10) Patent No.: US 10,046,302 B2
(45) Date of Patent: Aug. 14, 2018

(54) APPARATUS FOR MANUFACTURING POTASSIUM COMPOUND AND METHOD OF RECOVERING POTASSIUM COMPOUND FROM BRINE

(71) Applicants: RESEARCH INSTITUTE OF INDUSTRIAL SCIENCE & TECHNOLOGY, Pohang-si, Gyeongsangbuk-do (KR); POSCO, Pohang-si, Gyeongsangbuk-do (KR); MPPLY CO., LTD., Daejeong (KR)

(72) Inventors: Uong Chon, Pohang-si (KR); Gi-Chun Han, Cheongju-si (KR); Im Chang Lee, Daejeon (KR); Ki Young Kim, Pohang-si (KR); Woon kyoung Park, Pohang-si (KR)

(73) Assignees: RESEARCH INSTITUTE OF INDUSTRIAL SCIENCE & TECHNOLOGY, Pohang-si, Gyeongsangbuk-do (KR); POSCO, Pohang-Si, Gyeongsangbuk-Do (KR); MPPLY CO., LTD., Daejeon (KR)

( * ) Notice: Subject to any disclaimer, the term of this patent is extended or adjusted under 35 U.S.C. 154(b) by 10 days.

(21) Appl. No.: 14/909,436

(22) PCT Filed: Jul. 30, 2014

(86) PCT No.: PCT/KR2014/006996
§ 371 (c)(1),
(2) Date: Feb. 1, 2016

(87) PCT Pub. No.: WO2015/016607
PCT Pub. Date: Feb. 5, 2015

(65) Prior Publication Data
US 2016/0184794 A1    Jun. 30, 2016

(30) Foreign Application Priority Data

Jul. 31, 2013 (KR) .................. 10-2013-0090983
Mar. 21, 2014 (KR) .................. 10-2014-0033545

(51) Int. Cl.
*B01J 19/24* (2006.01)
*C01D 5/02* (2006.01)
(Continued)

(52) U.S. Cl.
CPC .......... *B01J 19/24* (2013.01); *B01D 21/0027* (2013.01); *B01D 21/283* (2013.01);
(Continued)

(58) Field of Classification Search
CPC .................. B01J 19/24; B01J 2219/24; B01J 2219/00006; B01J 19/245;
(Continued)

(56) References Cited

U.S. PATENT DOCUMENTS

| 1,394,978 A | 10/1921 | Dolbear et al. |
| 2,804,371 A | 8/1957 | Dancy et al. |

(Continued)

FOREIGN PATENT DOCUMENTS

| CN | 1150120 A | 5/1997 |
| CN | 1962443 A | 5/2007 |
| RU | 2161125 C2 | 12/2000 |

OTHER PUBLICATIONS

Written Opinion and International Search Report dated Nov. 11, 2014 in International Patent Application No. PCT/KR2014/006996.
(Continued)

*Primary Examiner* — Joseph Drodge
(74) *Attorney, Agent, or Firm* — McDermott Will & Emery LLP (57) ABSTRACT

The present invention relates to an apparatus for manufacturing a potassium compound and a method of recovering a
(Continued)

potassium compound from a brine, and provides the apparatus for manufacturing the potassium compound, including: a continuous pre-treatment apparatus including a crushing portion, a pulverization portion, and a particle size separation portion for processing a mixed raw material salt obtained after lithium, magnesium, and calcium are extracted from a brine to have a particle size for easy separation and sorting; a continuous potassium compound lump recovering apparatus continuously separating and recovering the potassium compound from the pre-treated mixed raw material salt; a continuous potassium compound separating and sorting apparatus continuously separating and sorting potassium chloride and a glaserite ($Na_2SO_4 \cdot 3K_2SO_4$) from the recovered potassium compound; and a continuous potassium sulfate conversion apparatus extracting potassium sulfate from the separated glaserite.

22 Claims, 6 Drawing Sheets

(51) Int. Cl.
| | |
|---|---|
| *C01D 3/06* | (2006.01) |
| *B03D 1/14* | (2006.01) |
| *B01D 21/28* | (2006.01) |
| *B01D 17/12* | (2006.01) |
| *B01D 21/00* | (2006.01) |
| *C01D 5/16* | (2006.01) |
| *C01D 3/08* | (2006.01) |

(52) U.S. Cl.
CPC ......... *B03D 1/1431* (2013.01); *B03D 1/1462* (2013.01); *C01D 3/06* (2013.01); *C01D 3/08* (2013.01); *C01D 5/02* (2013.01); *C01D 5/16* (2013.01); *B01J 2219/00006* (2013.01); *B01J 2219/24* (2013.01)

(58) Field of Classification Search
CPC .... B01J 2219/00049; B01J 2219/00164; B01J 2219/00186; B01J 2219/00479; B01J 2219/00481; B01J 2219/0873; B01J 2219/0881; B01J 2219/089; C01D 3/06; C01D 3/08; C01D 5/02; C01D 5/16; C01D 3/14; C01D 3/16; C01D 13/00; C01D 15/00; C01D 15/04; C01D 15/06; B01D 17/00; B01D 17/08; B01D 17/12; B01D 21/00; B01D 21/0027; B01D 21/0084; B01D 21/28; B01D 21/283; B01D 21/284; B01D 21/30; B01D 21/302; B01D 21/34; B01D 36/00; B01D 36/04; B03D 1/02; B03D 1/028; B03D 1/14; B03D 1/1431; B03D 1/1443; B03D 1/1456; B03D 1/1462; B03D 1/1468; B03D 3/06; B03D 2203/02
USPC .... 209/10, 12.1, 17, 18, 162–169, 174, 175; 210/96.1, 101, 134, 202, 203, 205–208, 210/259, 703–705, 719, 738; 422/187, 422/600, 608, 620, 630, 224, 225; 423/179, 180, 184, 195–197, 551, 552
See application file for complete search history.

(56) References Cited

U.S. PATENT DOCUMENTS

| | | | | |
|---|---|---|---|---|
| 2,937,751 | A * | 5/1960 | Schoeld | B03D 1/01 209/166 |
| 3,202,281 | A * | 8/1965 | Weston | B01J 19/10 209/164 |
| 3,432,031 | A * | 3/1969 | Lockwood | C01D 5/10 209/10 |
| 3,528,767 | A | 9/1970 | Garrett | |
| 3,933,625 | A * | 1/1976 | Nagano | B03B 1/00 209/167 |
| 3,998,935 | A * | 12/1976 | Adams | C01B 7/035 23/302 R |
| 4,028,229 | A * | 6/1977 | Dell | B03D 1/22 209/164 |
| 8,551,429 | B2 * | 10/2013 | Neuman | C01D 5/00 23/302 R |
| 2007/0125715 | A1 * | 6/2007 | Christiansen | B01D 17/0205 210/703 |
| 2010/0266482 | A1 | 10/2010 | Paul et al. | |
| 2015/0083646 | A1 * | 3/2015 | Didden | B03D 1/023 209/10 |
| 2016/0194208 | A1 * | 7/2016 | Lake | C01B 31/24 423/428 |

OTHER PUBLICATIONS

D. G. Foot, Jr., et al., "Potash Recovery From Process and Waste Brines by Solar Evaporation and Flotation," Bureau of Mines Report of Investigations, U.S. Department of the Interior, 1984, pp. 1-27.

* cited by examiner

APPARATUS FOR MANUFACTURING POTASSIUM COMPOUND AND METHOD OF RECOVERING POTASSIUM COMPOUND FROM BRINE

RELATED APPLICATIONS

This application is the U.S. National Phase under 35 U.S.C. § 371 of International Application No. PCT/KR2014/006996, filed on Jul. 30, 2014, which in turn claims the benefit of Korean Application Nos. 10-2013-0090983, filed on Jul. 31, 2013 and 10-2014-0033545, filed on Mar. 21, 2014 the disclosures of which Applications are incorporated by reference herein.

TECHNICAL FIELD

The present invention relates to an apparatus for manufacturing a potassium compound and a method of recovering a potassium compound from a brine.

BACKGROUND ART

In general, potassium compounds such as potassium chloride (KCl) and potassium sulfate ($K_2SO_4$), which are extensively used for fertilizers, are obtained from various raw materials.

Among them, an example is to recover the potassium compound from seawater or a brine.

However, since various monovalent or divalent metal ions exist in seawater and brine, it is very difficult to selectively recover only the potassium compound.

Further, if economic feasibility of the recovering process is considered, a continuous process constitution is required, and there should be no resulting corrosion due to high concentration of salts.

Accordingly, an economical and effective process of recovering the potassium compound is required.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a process constitution and apparatus for sorting only a potassium compound (KCl, $Na_2SO_4 \cdot 3K_2SO_4$) in a lump from a brine to perform separation and recovering, and manufacturing potassium chloride (KCl) and potassium sulfate ($K_2SO_4$) of a single phase from the recovered potassium compound.

Technical Solution

Further, the present invention has been made in an effort to provide a continuous process constitution for large capacity commercialization, and a method of solving an equipment corrosion problem according to use of a high concentration brine.

An exemplary embodiment of the present invention provides an apparatus for manufacturing a potassium compound, including: a continuous pre-treatment apparatus including a crushing portion, a pulverization portion, and a particle size separation portion for processing a mixed raw material salt obtained after lithium, magnesium, and calcium are extracted from a brine to have a particle size for easy separation and sorting; a continuous potassium compound lump recovering apparatus continuously separating and recovering the potassium compound from the pre-treated mixed raw material salt; a continuous potassium compound separating and sorting apparatus continuously separating and sorting potassium chloride and a glaserite ($Na_2SO_4 \cdot 3K_2SO_4$) from the recovered potassium compound; and a continuous potassium sulfate conversion apparatus extracting potassium sulfate from the separated glaserite.

potassium compound lump recovering apparatus may include: an automatic raw material addition apparatus automatically adding the mixed raw material salt, the saturated brine, and a floatation reagent into a continuous potassium compound floating and sorting apparatus; a conditioner mixing the mixed raw material salt and the saturated brine to manufacture a slurry and mixing the floatation reagent therewith; the continuous potassium compound floating and sorting apparatus injecting bubbles into a slurry solution where the mixed raw material salt, the saturated brine, and the floatation reagent are mixed to float the potassium compound and thus perform sorting; and a continuous solid-liquid separation apparatus performing solid-liquid separation of the sorted potassium compound and the residual slurry.

In the conditioner mixing the mixed raw material salt and the saturated brine to manufacture the slurry and mixing the floatation reagent therewith, the mixed raw material salt may be added at a weight ratio of 0.1 to 0.2 based on the saturated brine.

The floatation reagent may be sodium dodecyl sulfate.

The floatation reagent may be added at a weight ratio of 0.01 to 0.05 based on a slurry solution.

The continuous potassium compound floating and sorting apparatus may include: a plurality of cells where sorting is performed; a diffuser equipped in each of the cells to suck external air while rotating and thus form the small bubbles in the slurry solution; a scraper recovering the floated potassium compound; and a floating assistor applying ultrasonic wave vibration at a lower end of the cell to improve separation efficiency and purity.

The cell may have a structure where flow paths thereof are connected to each other to pass the slurry solution of which sorting is not finished to a next cell and thus attempt additional sorting, and the separated and sorted slurry solution is passed to the next cell to improve the purity of the potassium compound.

The diffuser may include an air inflow adjustment valve through which an amount of bubbles is adjusted.

A rotation speed of the diffuser may be 10 to 200 rpm.

A filtrate separated through the continuous solid-liquid separation apparatus performing solid-liquid separation of the sorted potassium compound and the residual slurry may include the saturated brine, and the filtrate including the saturated brine may be reused in the raw material automatic addition apparatus.

The continuous potassium compound separating and sorting apparatus may include: an automatic raw material addition apparatus automatically adding the potassium compound and a specific gravity liquid into a mixing machine; the mixing machine mixing the added potassium compound and specific gravity liquid to manufacture a slurry; a continuous potassium compound specific gravity sorting apparatus continuously separating potassium chloride and the glaserite by using a specific gravity difference of the potassium compound; and a continuous solid-liquid separation apparatus performing solid-liquid separation of sorted potassium chloride and glaserite.

A specific gravity of the specific gravity liquid may be 2.3 to 2.4.

In the mixing machine mixing the added potassium compound and specific gravity liquid to manufacture the slurry, a weight ratio of the potassium compound may be 0.1 to 0.4 based on the specific gravity liquid.

The mixing machine may further include an automatic proportional control valve for adjusting an amount of slurry added into the continuous potassium compound specific gravity sorting apparatus at a predetermined speed.

The potassium compound slurry may continuously flow into an intermediate portion of the potassium compound specific gravity sorting apparatus, and the apparatus may further include: a potassium chloride outlet of an upper portion of the specific gravity sorting apparatus, in which potassium chloride having a small specific gravity is floated and thus withdrawn; and a glaserite outlet of a lower portion of the specific gravity sorting apparatus, in which the glaserite having a large specific gravity descends and thus is withdrawn.

A filtrate separated by performing solid-liquid separation of sorted potassium chloride and glaserite by the continuous solid-liquid separation apparatus may include the specific gravity liquid, and the filtrate including the specific gravity liquid may be reused in the raw material automatic addition apparatus automatically adding the potassium compound and the specific gravity liquid into the mixing machine.

The continuous potassium sulfate conversion apparatus extracting potassium sulfate from the separated glaserite may include: an automatic raw material addition apparatus continuously adding the separated glaserite and a saturated potassium chloride aqueous solution; a continuous potassium sulfate reactor manufacturing potassium sulfate from the glaserite; and a solid-liquid separation apparatus performing solid-liquid separation of manufactured potassium sulfate.

The continuous potassium sulfate reactor manufacturing potassium sulfate from the glaserite may include a first reaction bath, a second reaction bath, and a continuous reaction mixer positioned at lower portions of the first and second reaction baths to allow a slurry to enter and then perform agitation and thus induce a reaction.

The first reaction bath and the second reaction bath may include: a partition positioned between the first reaction bath and the second reaction bath; a flow path formed at a lower portion of the partition; and an outlet positioned at an upper portion of the other side wall of the partition at which the flow path is formed, wherein the first reaction bath may be constituted so that the slurry enters at an upper portion and flows through the flow path at the lower portion of the partition existing between the first reaction bath and the second reaction bath from the first reaction bath to the second reaction bath, and the second reaction bath may be constituted so that the outlet exists at the upper portion of the other side wall of the partition therein to allow the slurry flowing thereinto from the first reaction bath to flow to the outside.

The continuous reaction mixer may be constituted so that a portion of the slurry enters from the lower portion of the second reaction bath, is agitated to induce the reaction, and is returned to the upper portion of the first reaction bath.

In the continuous reaction mixer, an amount of slurry entering and exiting may be adjusted through adjustment of a rotation number.

The continuous potassium sulfate reactor may have a structure where a plurality of reactors is connected in series.

A filtrate separated through the solid-liquid separation apparatus performing solid-liquid separation of manufactured potassium sulfate may include the saturated potassium chloride aqueous solution, and the filtrate including the saturated potassium chloride aqueous solution may be reused in the raw material automatic addition apparatus continuously adding the separated glaserite and the saturated potassium chloride aqueous solution.

Another exemplary embodiment of the present invention provides a method of recovering a potassium compound from a brine, including: preparing the brine; removing lithium, magnesium, and calcium in the brine and then obtaining a mixed raw material salt; mixing the mixed raw material salt and the saturated brine to manufacture a slurry and mixing a floatation reagent therewith; injecting bubbles into the slurry where the mixed raw material salt, the saturated brine, and the floatation reagent are mixed to selectively recover the potassium compound; separating and sorting potassium chloride and a glaserite ($Na_2SO_4.3K_2SO_4$) from the recovered potassium compound; and extracting potassium sulfate from the separated glaserite.

In the mixing of the mixed raw material salt and the saturated brine to manufacture the slurry and the mixing of the floatation reagent therewith, the mixed raw material salt may be added at a weight ratio of 0.1 to 0.2 based on the saturated brine.

The floatation reagent may be sodium dodecyl sulfate.

In the mixing of the mixed raw material salt and the saturated brine to manufacture the slurry and the mixing of the floatation reagent therewith, the floatation reagent may be added at a weight ratio of 0.01 to 0.05 based on the slurry.

The separating and sorting of potassium chloride and the glaserite ($Na_2SO_4.3K_2SO_4$) from the recovered potassium compound may include: mixing the potassium compound and a specific gravity liquid; and separating potassium chloride and the glaserite by using a specific gravity difference of the potassium compound.

A specific gravity of the specific gravity liquid may be 2.3 to 2.4.

In the mixing of the potassium compound and the specific gravity liquid, a weight ratio of the potassium compound may be 0.1 to 0.4 based on the specific gravity liquid.

The extracting of potassium sulfate from the separated glaserite may include: mixing the separated glaserite and a saturated potassium chloride aqueous solution to perform agitation; and extracting potassium sulfate from the glaserite.

Advantageous Effects

It is possible to provide a process configuration and an apparatus for sorting only a potassium compound (KCl, $Na_2SO_4.3K_2SO_4$) in a lump from a brine to perform separation and recovering, and manufacturing potassium chloride (KCl) and potassium sulfate ($K_2SO_4$) of a single phase from the recovered potassium compound.

Further, it is possible to provide a continuous process configuration for large capacity commercialization, and a method of solving an equipment corrosion problem according to use of a high concentration brine.

MODE FOR INVENTION

Hereinafter, exemplary embodiments of the present invention will be described in detail. However, the exemplary embodiments are illustrative only but are not to be construed to limit the present invention, and the present invention is just defined by the scope of the claims as will be described below.

Figure 1A:
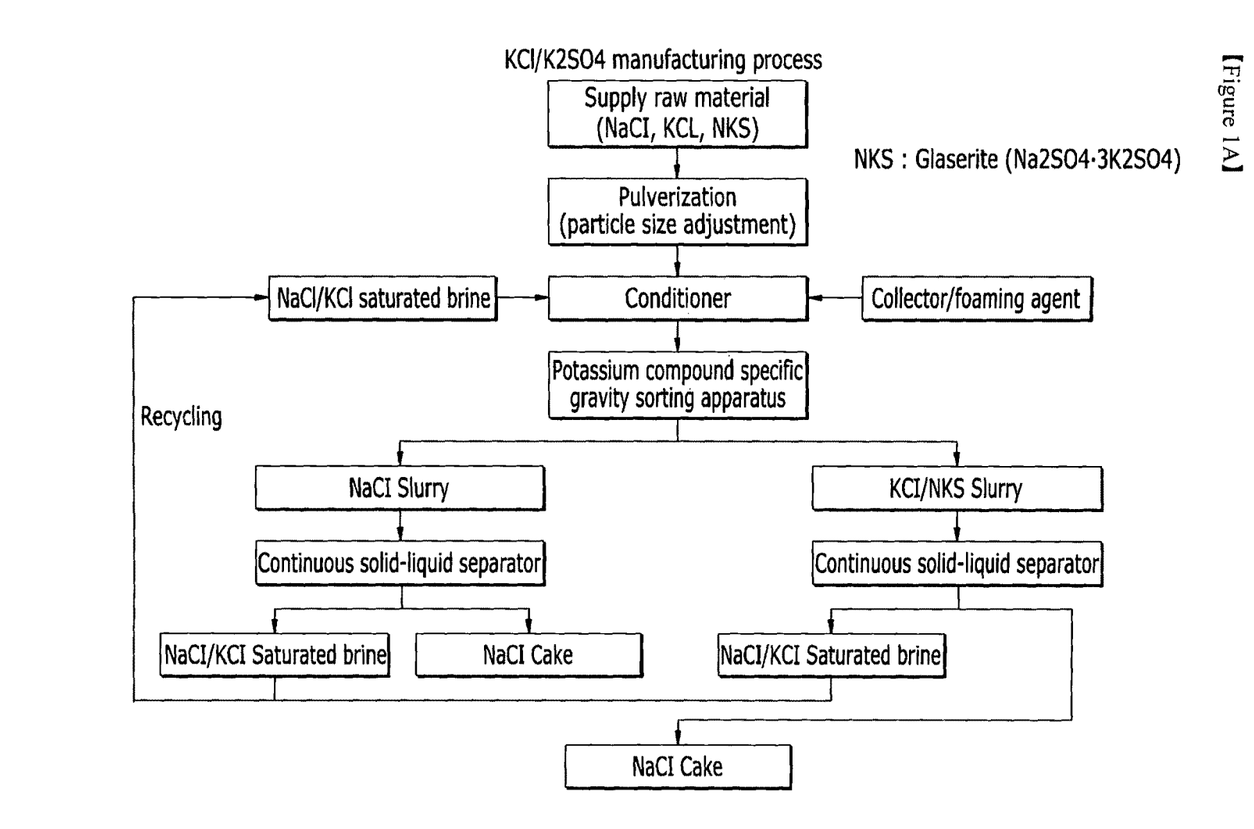
FIG. 1A and FIG. 1B are an entire process view of an apparatus for manufacturing a potassium compound according to an exemplary embodiment of the present invention.
Figure 1B:
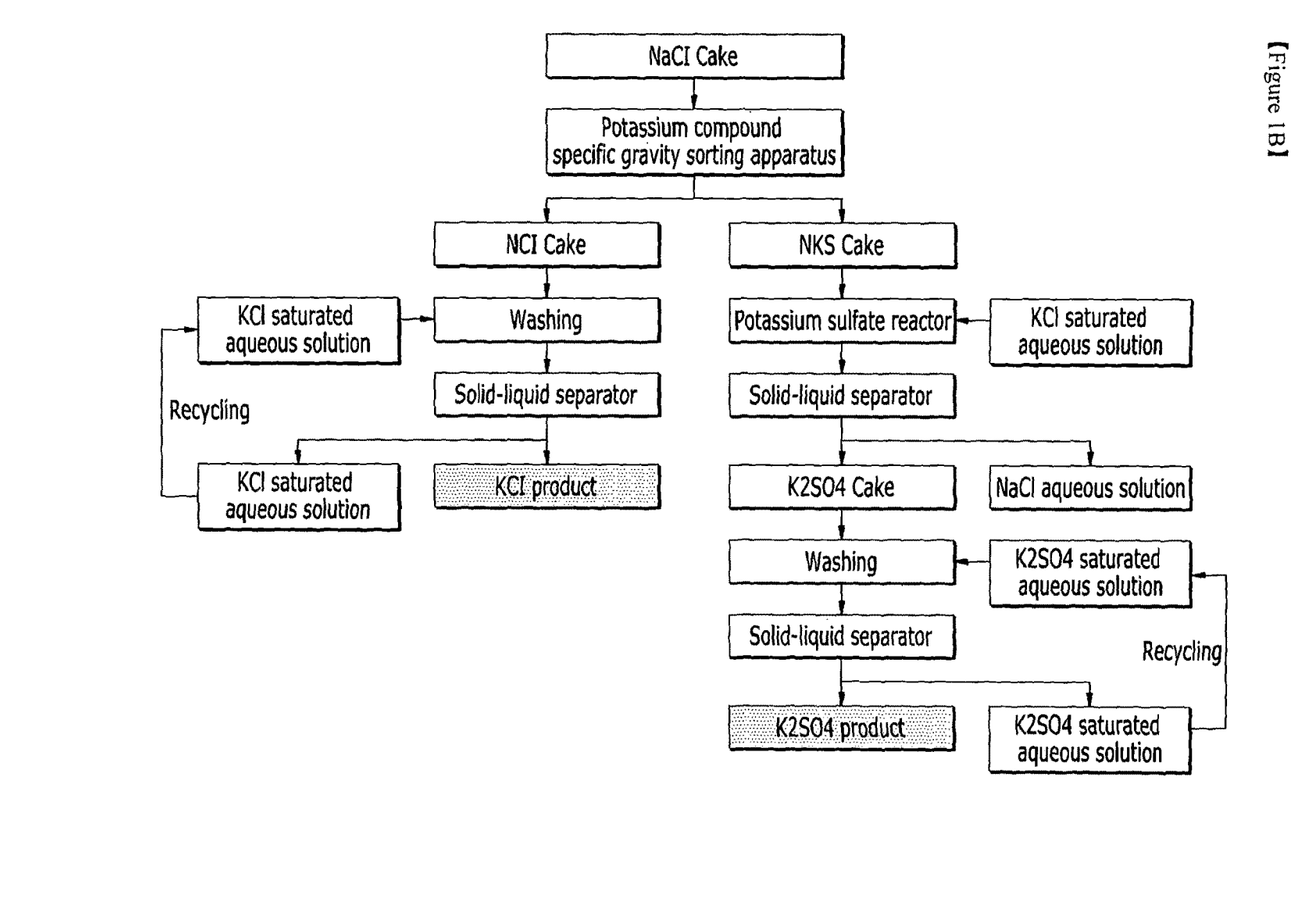

An apparatus for manufacturing a potassium compound according to the exemplary embodiment of the present invention may be a non-corrosion continuous apparatus for manufacturing a potassium compound of a single phase from a brine.

To be more specific, the apparatus may include: a continuous pre-treatment apparatus for performing crushing, pulverization, particle size separation, and the like for processing a mixed raw material salt ($NaCl$, $KCl$, $Na_2SO_4 \cdot 3K_2SO_4$, and the like) obtained through selective spontaneous vaporization so as to have a particle size for easy separation and sorting after lithium (Li), magnesium (Mg), calcium (Ca), and the like are extracted from a brine; a continuous potassium compound lump recovering apparatus continuously separating and recovering only the potassium compounds ($KCl$, $Na_2SO_4 \cdot 3K_2SO_4$) in a lump from the pre-treated mixed raw material salt; a continuous potassium compound separating and sorting apparatus continuously separating and sorting potassium chloride ($KCl$) and glaserite ($Na_2SO_4 \cdot 3K_2SO_4$) in a single phase from the recovered potassium compound ($KCl$, $Na_2SO_4 \cdot 3K_2SO_4$); and a continuous potassium sulfate conversion apparatus extracting potassium sulfate ($K_2SO_4$) from the separated glaserite.

Figure 2:
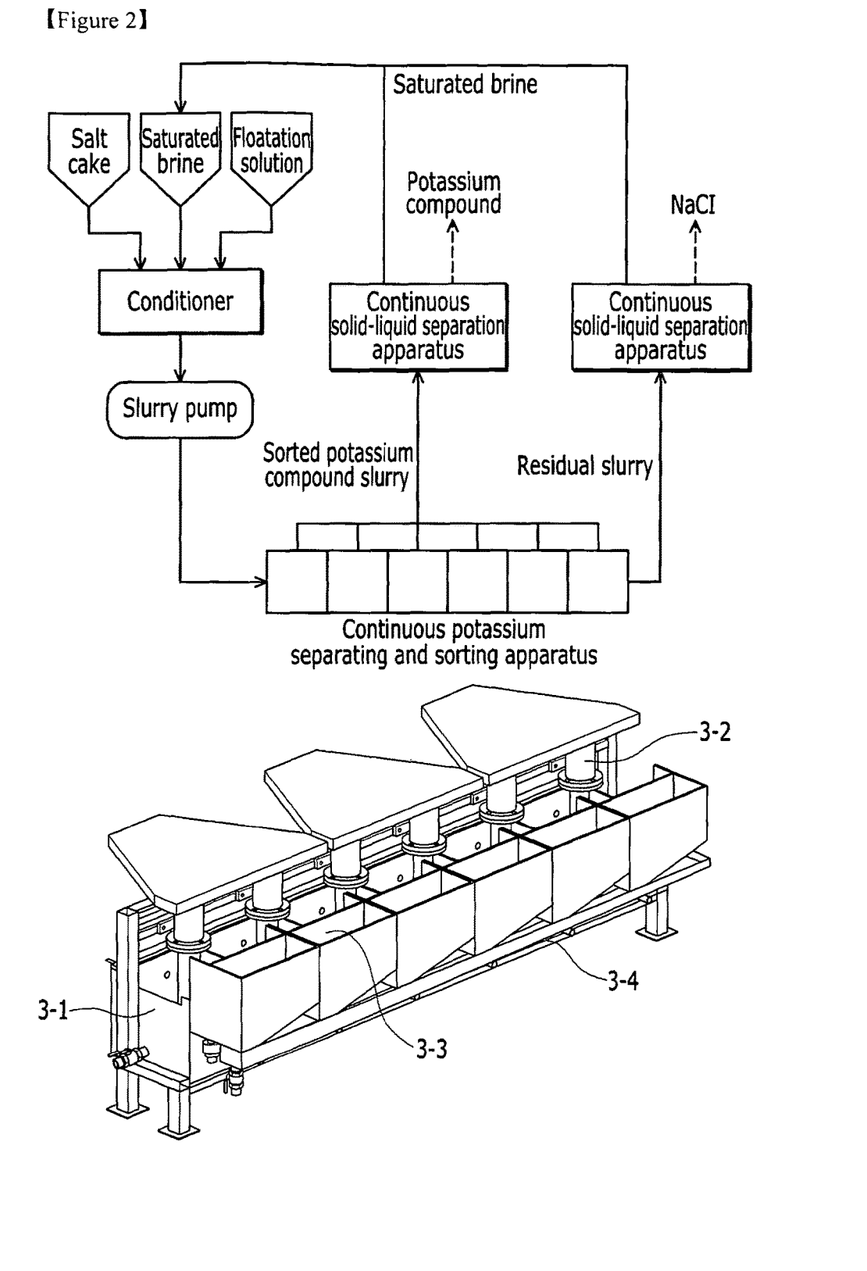
FIG. 2 is a detailed process view of a continuous potassium compound lump recovering apparatus in FIG. 1.

The continuous potassium compound lump recovering apparatus for continuously separating and recovering only the potassium compound in a lump from the mixed raw material salt may include: an automatic raw material addition apparatus storing the raw material salt, the saturated brine, and a floatation reagent and then continuously automatically adding predetermined amounts thereof into a floating and sorting apparatus; a conditioner mixing the raw material salt and the saturated brine to manufacture a slurry and mixing the floatation reagent therewith; a continuous potassium compound floating and sorting apparatus injecting bubbles into a slurry solution where the raw material salt, the saturated brine, and the floatation reagent are mixed to float the potassium compound and thus perform sorting; and a continuous solid-liquid separation apparatus performing solid-liquid separation of the sorted potassium compound slurry and the residual slurry to be separated into a salt cake and a filtrate (saturated brine).

When the slurry is manufactured by mixing the raw material salt and the saturated brine, the raw material salt may be added at a weight ratio of 0.1 to 0.2 based on the saturated brine to manufacture the slurry solution.

The saturated brine may be a brine in a state where lithium, magnesium, and calcium are removed.

Sodium dodecyl sulfate may be used as the floatation reagent for sorting only the potassium compound in a lump from the mixed raw material salt. However, the floatation reagent is not limited thereto.

In this case, the floatation reagent may be added at a weight ratio of 0.01 to 0.05 based on the slurry solution. However, the weight ratio is not limited thereto.

Figure 3:
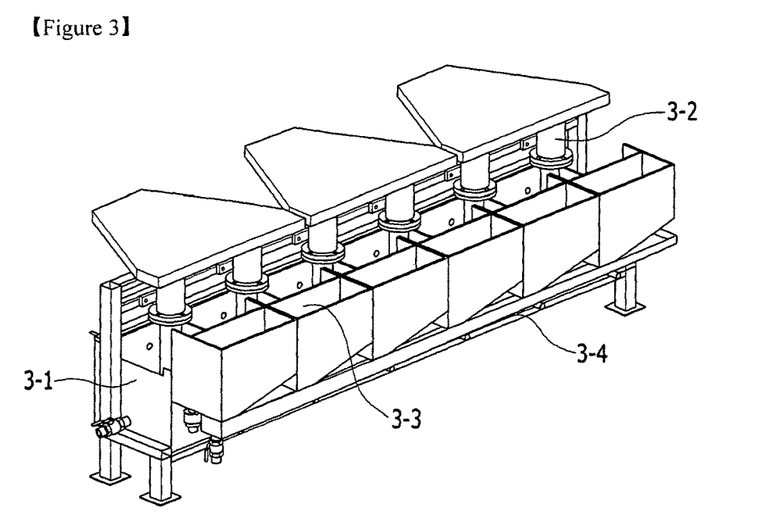
FIG. 3 is a schematic diagram of a continuous potassium compound floating and sorting apparatus in FIG. 2.

The continuous potassium compound floating and sorting apparatus may include: a plurality of cells where sorting is performed; a diffuser equipped in each of the cells to suck external air while rotating and thus form small bubbles in the slurry solution; a scraper recovering the floated potassium compound; and a floating assistor applying ultrasonic wave vibration at a lower end of the cell to improve separation efficiency and purity.

In this case, flow paths of the separating and sorting cell may be connected to each other to pass the slurry solution where sorting is not finished to a next cell and thus additional sorting may be attempted, and the separated and sorted slurry solution may be passed to the next cell to improve the purity of the potassium compound.

Further, the diffuser may operate an air inflow adjustment valve to adjust an amount of bubbles.

In this case, a rotation speed of the diffuser may be changed from 10 rpm to 200 rpm.

The saturated brine obtained by performing solid-liquid separation of the sorted potassium compound slurry and residual slurry may be sent to a saturated brine storage tank to be recycled.

Figure 4:
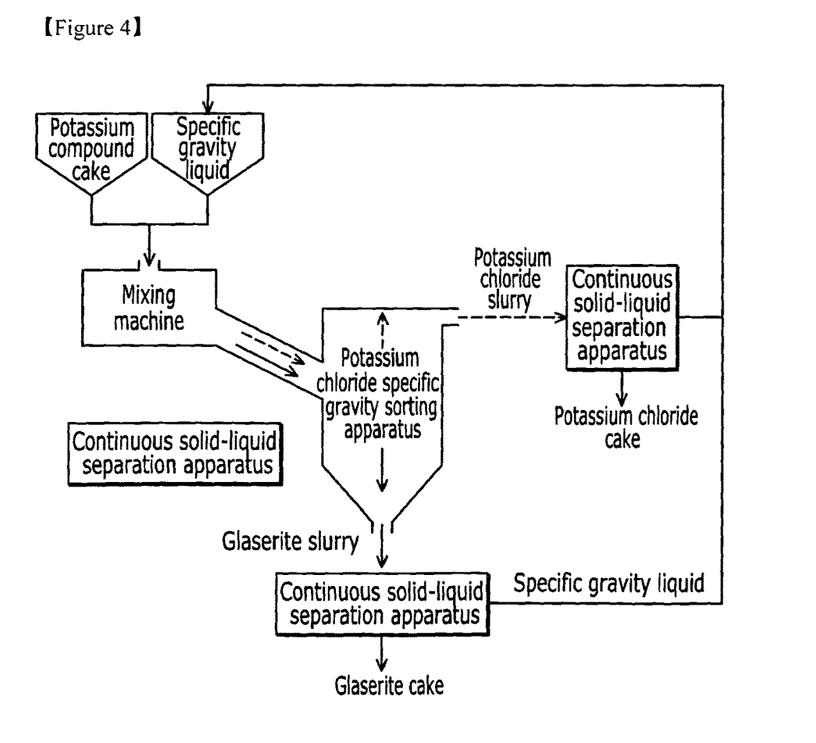
FIG. 4 is a detailed process view of a continuous potassium compound separating and sorting apparatus in FIG. 1.

The continuous potassium compound separating and sorting apparatus continuously separating and sorting potassium chloride and the glaserite in a single phase from the recovered potassium compound may include: an automatic raw material addition apparatus storing the potassium compound and a specific gravity liquid and then continuously automatically adding the potassium compound and the specific gravity liquid; a mixing machine mixing the added potassium compound and specific gravity liquid to manufacture a slurry; a continuous potassium compound specific gravity sorting apparatus continuously performing separation into potassium chloride and the glaserite by using a specific gravity difference of the potassium compound; and a continuous solid-liquid separation apparatus performing solid-liquid separation of the sorted potassium chloride slurry and glaserite slurry to be separated into potassium chloride, a glaserite cake, and the specific gravity liquid.

Among the raw materials, the specific gravity of potassium chloride is 1.99, the specific gravity of the glaserite is 2.70, and the specific gravity liquid used to separate the two materials by using the specific gravity difference may be used after tetrabromoethane (specific gravity 2.96) and carbon tetrachloride (specific gravity 1.58) that are organic solvents are mixed at a predetermined ratio so that the total specific gravity is 2.3 to 2.4.

In this case, when the potassium compound and the specific gravity liquid are mixed to manufacture the slurry, the potassium compound may be added at a weight ratio of 0.1 to 0.4 based on the specific gravity liquid. However, the weight ratio is not limited thereto.

Further, a predetermined amount of the slurry where the potassium compound and the specific gravity liquid are mixed is continuously added into the potassium compound specific gravity sorting apparatus through gravity, and in this case, the addition may be adjusted by an automatic proportional control valve.

Figure 5:
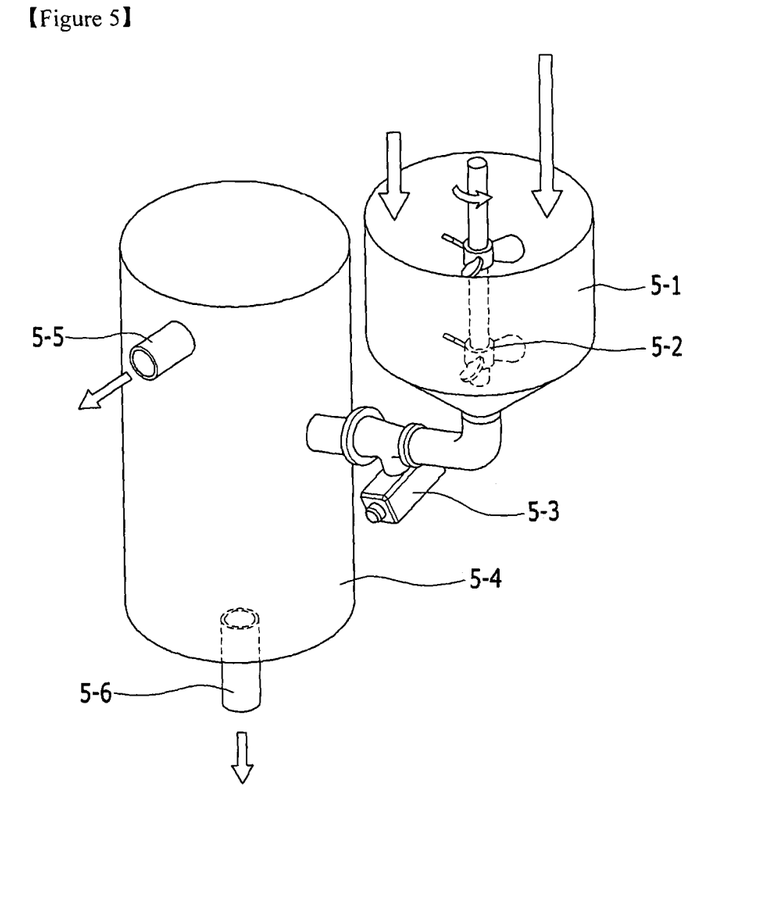
FIG. 5 is a schematic diagram of a continuous potassium compound specific gravity sorting apparatus in FIG. 4.

The potassium compound slurry may continuously flow into an intermediate portion of a lateral surface of the potassium compound specific gravity sorting apparatus in a predetermined amount, potassium chloride having the low specific gravity may be floated and thus withdrawn through a potassium chloride outlet of an upper portion of the specific gravity sorting apparatus, and the glaserite having the high specific gravity may descend and thus may be withdrawn through a glaserite outlet of a lower portion of the specific gravity sorting apparatus.

The separated and withdrawn potassium chloride slurry and glaserite slurry are continuously subjected to solid-liquid separation by using the continuous solid-liquid separation apparatus, and the recovered specific gravity liquid may be sent to a specific gravity liquid storage tank to be recycled.

Figure 6:
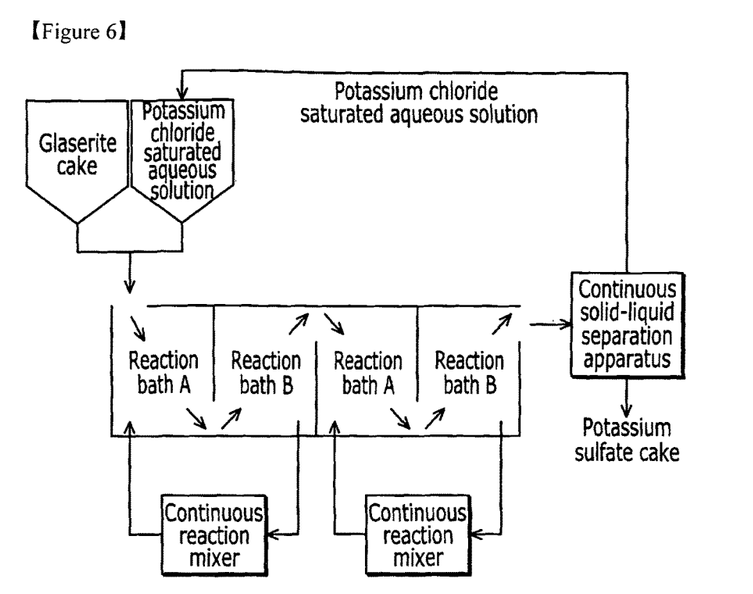
FIG. 6 is a detailed process view of a continuous potassium sulfate conversion apparatus in FIG. 1.

Meanwhile, the continuous potassium sulfate conversion apparatus extracting potassium sulfate from the separated glaserite may be constituted by: an automatic raw material addition apparatus continuously adding the glaserite and a saturated potassium chloride aqueous solution in a predetermined amount; a continuous potassium sulfate reactor continuously manufacturing potassium sulfate from the glaserite; and a continuous solid-liquid separation apparatus performing solid-liquid separation of the potassium sulfate slurry where the reaction is finished to recover a potassium sulfate cake.

Figure 7:
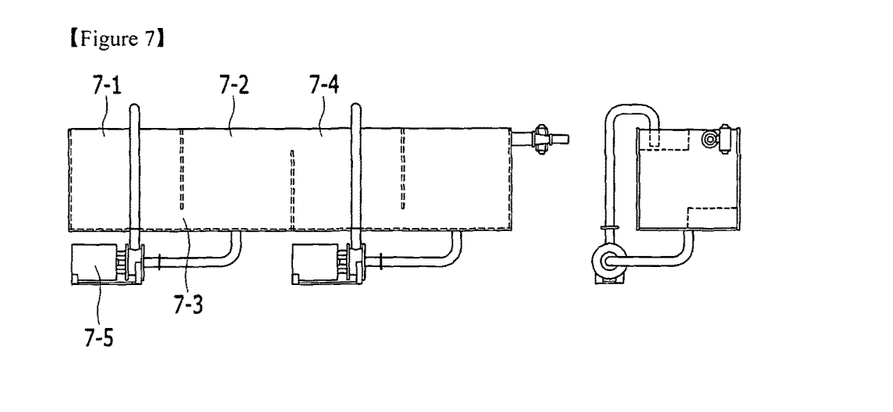
FIG. 7 is a schematic diagram of a continuous potassium sulfate reactor in FIG. 6.

The continuous potassium sulfate reactor may be constituted by a reaction bath constituted by a first reaction bath A and a second reaction bath B, and a continuous reaction mixer positioned at lower portions of the two reaction baths to incorporate the slurry and thus induce the reaction through high speed agitation.

In the case of the reaction bath, the reaction bath A may be constituted so that the slurry enters an upper portion of the reaction bath A and an outlet exists at a lower portion of a partition existing between the reaction bath A and the reaction bath B to allow the slurry to flow from the reaction bath A to the reaction bath B, and the reaction bath B may be constituted so that the outlet exists at a partition upper portion at an opposite side of the partition to the reaction bath A to allow the slurry flowing thereinto from the reaction bath A to flow to the outside.

The continuous reaction mixer may be constituted so that a portion of the slurry flowing from the reaction bath A to the reaction bath B enters from the lower portion of the reaction bath B, induces the reaction through high speed agitation, and is returned to the upper portion of the reaction bath A again.

Accordingly, the continuous potassium sulfate reactor may have a structure where the slurry flows into the upper portion of the reaction bath A, flows through a path formed at the lower portion of the partition of the two reaction baths to the reaction bath B, and flows back through the outlet at the upper portion of the reaction bath B to the outside, but a portion of the slurry of the reaction bath B is returned to the reaction bath A again by the continuous reaction mixer.

The continuous reaction mixer may have a structure where an amount of the entering and exiting slurry is adjusted through adjustment of rpm to adjust the amount of the slurry returned from the reaction bath B to the reaction bath A, thereby adjusting the total reactor treatment speed.

The continuous potassium sulfate reactor may have a structure where a plurality of reactors are connected in series to increase treatment efficiency.

The potassium sulfate slurry manufactured through the continuous potassium sulfate reactor may be continuously subjected to solid-liquid separation by using the continuous solid-liquid separation apparatus, and the recovered potassium chloride saturated aqueous solution may be sent to the storage tank to be recycled.

Further, all devices coming into contact with the brine may be made of PVC, PE, FRP, and the like in order to prevent corrosion.

Hereinafter, preferable exemplary embodiments of the present invention will be described in detail with reference to the accompanying illustrated drawings.

Operation relationships of the non-corrosion continuous apparatus for manufacturing the potassium compound of the single phase from the brine, which has the aforementioned constitution, will be described below.

First, if the brine from which lithium (Li), magnesium (Mg), and calcium (Ca) are removed is spontaneously vaporized, the mixed raw material salt (NaCl, KCl, $Na_2SO_4 \cdot 3K_2SO_4$, and the like) is precipitated, and the precipitated mixed raw material salt is recovered, dried, and pulverized to prepare the raw material. Further, a saturated aqueous solution of sodium chloride (NaCl) and potassium chloride (KCl) is prepared in order to prevent the raw material salt from being dissolved by water added to manufacture the raw material salt slurry. In addition, sodium dodecyl sulfate is prepared as the floatation reagent.

A raw material salt powder, the saturated brine, and the floatation reagent are each put into the storage tank, continuously added at a predetermined amount into the conditioner through an automatic supply apparatus, and sufficiently mixed through high speed agitation to satisfactorily apply a floatation solution on surfaces of raw material salt particles.

If the raw material salt, the saturated brine, and the floatation reagent are sufficiently mixed in the conditioner, the floatation reagent is applied on only the surfaces of the potassium (K) compound particles by surface electric charges of the raw material salt particles, and the particles on which the floatation reagent is applied have hydrophobicity.

The raw material salt slurry solution pre-treated by the floatation reagent is continuously supplied to a first cell of the potassium compound floating and sorting apparatus by using a slurry pump.

The continuous potassium compound floating and sorting apparatus is constituted by at least two cells, and the diffuser allowing air to flow thereinto by causing a vacuum through rotation in the solution and forming the bubbles by air flowing thereinto is equipped in each cell. In this diffuser, an air inflow amount may be adjusted through the air inflow adjustment valve, and the air inflow amount and a bubble generation amount may be adjusted while a rotation speed is changed between 10 to 200 rpm.

Further, a floating assistor rapidly separating the potassium (K) compound particles and the sodium chloride (NaCl) particles in the solution through ultrasonic wave vibration to improve a recovering yield and purity of the potassium compound is equipped at a lower portion of the cell.

If the bubbles are generated by the diffuser at a lower portion of the raw material salt slurry supplied to the first cell of the continuous potassium compound floating and sorting apparatus, the bubbles are floated to an upper portion of the slurry solution to attach the potassium (K) compound particles having hydrophobicity caused by the floatation reagent to the bubbles and thus float the particles and the bubbles together.

The floated potassium (K) compound is recovered by the scraper, the residual slurry is passed through the flow path formed in a lateral surface of the cell to a second cell, and the potassium compound which is not completely recovered in the first cell is recovered once again by the same operation as the first cell in the second cell. The potassium compound in the slurry is recovered at 90% or more by the same method while passing through a third cell and a fourth cell, and a number of cells may be further added in order to further increase a recovering ratio.

Meanwhile, the recovered potassium compound may enter the cell for washing to be subjected to the same treatment as in the separating and sorting cell once again and thus improve the purity.

In the potassium compound slurry which is recovered and completely washed, a potassium compound cake is recovered through the continuous solid-liquid separation apparatus, and the remaining saturated brine filtrate is recycled again in a process.

Meanwhile, the residual slurry remaining after the potassium compound is recovered is identically separated into a sodium chloride (NaCl) cake and the saturated brine through the continuous solid-liquid separation apparatus, and the saturated brine is recycled during the process.

The recovered potassium compound cake is passed to the continuous potassium compound separating and sorting apparatus in order to be separated into the potassium chloride and the glaserite of the single phase and thus recovered.

The potassium compound cake recovered by the continuous potassium compound lump recovering apparatus is continuously added together with the previously prepared specific gravity liquid at a predetermined addition rate into the mixing machine of the continuous potassium compound separating and sorting apparatus to be uniformly mixed by an agitator in the mixing machine.

In this case, the used specific gravity liquid is manufactured to have specific gravity of 2.3 to 2.4 that is an intermediate value of the specific gravities of the two materials in order to maximize separation efficiency of potassium chloride (specific gravity 1.99) and glaserite (specific gravity 2.70) and used, and this specific gravity liquid may be manufactured to have a desired specific gravity by mixing tetrabromoethane (specific gravity 2.96) and carbon tetrachloride (specific gravity 1.58) that are organic solvents at a predetermined ratio.

In the mixing machine, the uniformly mixed potassium compound slurry is added at a predetermined rate into the continuous potassium compound specific gravity sorting apparatus by using gravity of the device.

In this case, an addition rate of the slurry for establishment of a separation condition may be adjusted by operating the automatic proportional control valve equipped at a lower portion of the mixing machine.

In the potassium compound slurry added at a predetermined rate into the continuous potassium compound specific gravity sorting apparatus, the potassium chloride particles are floated to an upper portion due to a specific gravity difference, and the floated potassium chloride slurry is withdrawn through an outlet of the upper portion.

Further, the glaserite particles having the high specific gravity descend to the lower portion, and the glaserite slurry descending to the lower portion is withdrawn through an outlet positioned at the lower portion.

The potassium chloride slurry and the glaserite slurry withdrawn from the outlets of the upper and lower portions of the continuous potassium compound specific gravity sorting apparatus each enter the continuous solid-liquid separation apparatus to recover potassium chloride and the glaserite in a cake state and allow the separated specific gravity liquid to flow into a specific gravity liquid storage tank and thus be recycled.

Herein, the recovered potassium chloride cake is finally commercialized, and the glaserite cake recovered together therewith is passed to a continuous potassium sulfate converter in order to extract potassium sulfate of the single phase.

The glaserite cake is peptized together with the previously prepared potassium chloride saturated aqueous solution in the storage tank to manufacture the slurry, and this slurry is continuously added at a predetermined rate into an upper portion of the reaction bath A of the continuous potassium sulfate reactor.

The added glaserite slurry is moved through the outlet at the lower portion of the partition existing between the reaction bath A and the reaction bath B to the reaction bath B.

A portion of the slurry moving to the reaction bath B is passed to a next reaction bath through the outlet positioned at the partition upper portion at the opposite side of the partition to the reaction bath A, and the other portion of the slurry enters the continuous reaction mixer through an inlet positioned at the lower portion of the reaction bath B.

The slurry entering the continuous reaction mixer induces an extraction reaction of potassium sulfate through high speed agitation, and is returned through an inlet positioned at the upper portion of the reaction bath A to the reaction bath A.

The continuous potassium sulfate reactor may control the total slurry moving rate by moving a portion of the slurry moved to the next reaction bath as described above back to a prior reaction bath, and a reaction time for extracting potassium sulfate may be secured therethrough.

Controlling of the slurry moving rate may be implemented by adjusting the rpm of the continuous reaction mixer to adjust an amount of the slurry returned to the prior reaction bath.

As described above, a plurality of continuous potassium sulfate reactors constituted by the reaction bath A, the reaction bath B, and the continuous reaction mixer may be connected in series to constitute the entire reactor.

From the slurry withdrawn through the final reaction bath of the continuous potassium sulfate reactor, the potassium sulfate cake is obtained through the continuous solid-liquid separation apparatus, and this is finally commercialized.

Further, the potassium chloride saturated aqueous solution subjected to solid-liquid separation may be sent to the storage tank to be recycled.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 3-1: Sorting cell of continuous potassium compound lump recovering apparatus
3-2: Diffuser 3-3: Scraper
3-4: Floating assistor
5-1: Mixing machine
5-2: Agitator
5-3: Automatic proportional control valve
5-4: Continuous potassium compound specific gravity sorting apparatus
5-5: Potassium chloride slurry outlet
5-6: Glaserite slurry outlet
7-1: Reaction bath A
7-2: Reaction bath B
7-3: A reaction bath outlet
7-4: B reaction bath outlet
7-5: Continuous reaction mixer

The invention claimed is:

1. An apparatus for manufacturing a potassium compound, comprising:
a pre-treatment apparatus for processing a mixed raw material salt obtained from a brine to form a pre-treated mixed raw material salt including a potassium compound;
a potassium compound recovering apparatus for separating and recovering the potassium compound from the pre-treated mixed raw material salt;
a potassium compound separating and sorting apparatus for separating and sorting potassium chloride and a glaserite ($Na_2SO_4 \cdot 3K_2SO_4$) from the recovered potassium compound; and
a potassium sulfate conversion apparatus for extracting potassium sulfate from the separated glaserite,
wherein the potassium compound recovering apparatus includes a potassium compound floating and sorting apparatus,
wherein the potassium compound floating and sorting apparatus includes
a plurality of cells for sorting,
a diffuser equipped in each of the cells to suck external air while rotating to form small bubbles in a slurry solution;
a scraper for recovering the floated potassium compound, and
a floating assistor applying ultrasonic wave vibration at a lower end of the cell to improve separation efficiency and purity.

2. The apparatus of claim 1, wherein
the potassium compound recovering apparatus includes:
a raw material addition apparatus for adding the mixed raw material salt, saturated brine, and a floatation reagent into the potassium compound floating and sorting apparatus;
a conditioner for mixing the mixed raw material salt and the saturated brine to manufacture a slurry and mixing the floatation reagent therewith;
the potassium compound floating and sorting apparatus for injecting bubbles into a slurry solution where the mixed raw material salt, the saturated brine, and the floatation reagent are mixed to float the potassium compound and thus perform sorting; and
a solid-liquid separation apparatus for performing solid-liquid separation of the sorted potassium compound and the residual slurry.

3. The apparatus of claim 2, wherein,
the conditioner mixing the mixed raw material salt and the saturated brine to manufacture the slurry and mixing the floatation reagent therewith is configured such that the mixed raw material salt is added at a weight ratio of 0.1 to 0.2 based on the saturated brine.

4. The apparatus of claim 2, wherein
the floatation reagent is sodium dodecyl sulfate.

5. The apparatus of claim 4, wherein
the potassium compound floating and sorting apparatus is configured such that the floatation reagent is added at a weight ratio of 0.01 to 0.05 relative to the slurry solution.

6. The apparatus of claim 2, further comprising
a conduit operable to recirculate a filtrate separated through the solid-liquid separation apparatus performing solid-liquid separation of the sorted potassium compound and residual slurry including the saturated brine to the raw material addition apparatus.

7. The apparatus of claim 1, wherein
the plurality of cells are connected in series, and
the separated and sorted slurry solution is passed from one cell in the plurality of cells to the next cell to improve the purity of the potassium compound.

8. The apparatus of claim 1, wherein
the diffuser includes an air inflow adjustment valve.

9. The apparatus of claim 1, wherein
the diffuser is configured such that a rotation speed of the diffuser is 10 to 200 rpm.

10. The apparatus of claim 1, wherein
the potassium compound separating and sorting apparatus includes:
a raw material addition apparatus for adding the potassium compound and a specific gravity liquid into a mixing machine;
the mixing machine for mixing the added potassium compound and specific gravity liquid to manufacture a slurry;
a potassium compound specific gravity sorting apparatus for separating potassium chloride and the glaserite by using a specific gravity difference of the potassium compound; and
a solid-liquid separation apparatus for performing solid-liquid separation of sorted potassium chloride and glaserite.

11. The apparatus of claim 10, wherein the mixing machine mixing the added potassium compound and the specific gravity liquid to manufacture a slurry is configured such that a specific gravity of the specific gravity liquid is 2.3 to 2.4.

12. The apparatus of claim 10, wherein
the mixing machine mixing the added potassium compound and specific gravity liquid to manufacture the slurry is configured such that a weight ratio of the potassium compound is 0.1 to 0.4 relative to specific gravity liquid.

13. The apparatus of claim 10, wherein
the mixing machine further includes a proportional control valve for adjusting an amount of the slurry added into the potassium compound specific gravity sorting apparatus at a predetermined speed.

14. The apparatus of claim 10, wherein
the potassium compound slurry flows into an intermediate portion of the potassium compound specific gravity sorting apparatus, and
the apparatus further includes:
a potassium chloride outlet of an upper portion of the specific gravity sorting apparatus, in which potassium chloride having a small specific gravity is floated and thus withdrawn; and
a glaserite outlet of a lower portion of the specific gravity sorting apparatus, in which the glaserite having a large specific gravity descends and thus is withdrawn.

15. The apparatus of claim 10, further comprising
a conduit operable to recirculate a filtrate separated by performing solid-liquid separation of sorted potassium chloride and glaserite by the solid-liquid separation apparatus including the specific gravity liquid to the raw material addition apparatus adding the potassium compound and the specific gravity liquid into the mixing machine.

16. The apparatus of claim 1, wherein
the potassium sulfate conversion apparatus extracting potassium sulfate from the separated glaserite includes:
a raw material addition apparatus for adding the separated glaserite and a saturated potassium chloride aqueous solution;
a potassium sulfate reactor for manufacturing potassium sulfate from the glaserite; and
a solid-liquid separation apparatus for performing solid-liquid separation of manufactured potassium sulfate.

17. The apparatus of claim 16, wherein
the potassium sulfate reactor manufacturing potassium sulfate from the glaserite includes
a first reaction bath, a second reaction bath, and
a reaction mixer positioned at lower portions of the first and second reaction baths to allow a slurry to enter and then perform agitation and thus induce a reaction.

18. The apparatus of claim 17, wherein
the first reaction bath and the second reaction bath include:
a partition positioned between the first reaction bath and the second reaction bath;
a flow path formed at a lower portion of the partition; and
an outlet positioned at an upper portion of the other side wall of the partition at which the flow path is formed, wherein the first reaction bath is constituted so that the slurry enters at an upper portion and flows through the flow path at the lower portion of the partition existing between the first reaction bath and the second reaction bath from the first reaction bath to the second reaction bath, and the second reaction bath is constituted so that the outlet exists at the upper portion of the other side wall of the partition therein to allow the slurry flowing thereinto from the first reaction bath to flow to the outside.

19. The apparatus of claim 17, wherein
the reaction mixer is constituted
so that a portion of the slurry enters from the lower portion of the second reaction bath, is agitated to induce the reaction, and is returned to the upper portion of the first reaction bath.

20. The apparatus of claim 19, wherein,
the reaction mixer is configured such that an amount of the slurry entering and exiting is adjusted through adjustment of a rotation member.

21. The apparatus of claim 16, wherein
the potassium sulfate reactor has a structure where a plurality of reactors are connected in series.

22. The apparatus of claim 16, further comprising
a conduit operable to recirculate a filtrate separated by the solid-liquid separation apparatus performing solid-liquid separation of manufactured potassium sulfate to the raw material addition apparatus adding the separated glaserite and the saturated potassium chloride aqueous solution.

* * * * *